US009213332B2

(12) United States Patent
Fish et al.

(10) Patent No.: US 9,213,332 B2
(45) Date of Patent: Dec. 15, 2015

(54) SYSTEM AND METHOD FOR AUTOMATED VEHICLE SELECTION AND AUTOMATED FIX DETECTION

(75) Inventors: James Fish, Birmingham, MI (US); Edward Lipscomb, Lakeville, MN (US); Dennis Keane, Owatonna, MN (US); Kevin Gray, Kalamazoo, MI (US); Madhusudhan Mavanoor Krishnegowda, Edina, MN (US); Randy Hamilton, Three Rivers, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 0 days.

(21) Appl. No.: 13/606,850

(22) Filed: Sep. 7, 2012

(65) Prior Publication Data
US 2014/0074343 A1 Mar. 13, 2014

(51) Int. Cl.
*G05B 23/02* (2006.01)
*G07C 5/08* (2006.01)
*F02D 41/22* (2006.01)

(52) U.S. Cl.
CPC .......... *G05B 23/0278* (2013.01); *G07C 5/0808* (2013.01); *F02D 41/22* (2013.01); *G07C 2205/02* (2013.01)

(58) Field of Classification Search
CPC ........ G05B 23/02; G06Q 90/00; G07C 5/008; G07C 5/085; G07C 5/0808; G06F 17/00; G06F 11/0748; F02D 41/22
USPC .......... 701/29.6, 31.4, 33.4; 43/61; 714/38.13
See application file for complete search history.

(56) References Cited

U.S. PATENT DOCUMENTS

| 5,491,631 | A | * | 2/1996 | Shirane et al. ............... 701/29.6 |
| 6,181,992 | B1 | | 1/2001 | Gurne et al. |
| 6,229,536 | B1 | | 5/2001 | Alexander et al. |
| 6,757,837 | B1 | * | 6/2004 | Platt et al. .................. 714/38.13 |
| 7,734,390 | B2 | | 6/2010 | Chen |
| 7,962,271 | B1 | | 6/2011 | Thompson et al. |
| 2002/0007237 | A1 | * | 1/2002 | Phung et al. .................... 701/33 |
| 2002/0077779 | A1 | | 6/2002 | Liebl et al. |
| 2003/0060953 | A1 | * | 3/2003 | Chen ............................... 701/33 |
| 2004/0205534 | A1 | | 10/2004 | Koelle |
| 2006/0047617 | A1 | | 3/2006 | Bacioiu et al. |
| 2006/0123692 | A1 | * | 6/2006 | Beronja ............................ 43/61 |
| 2006/0178791 | A1 | | 8/2006 | Fountain et al. |
| 2007/0050105 | A1 | | 3/2007 | Chinnadurai et al. |
| 2007/0088465 | A1 | | 4/2007 | Heffington |

(Continued)

FOREIGN PATENT DOCUMENTS

| CA | 2 506 472 A1 | 11/2006 |
| EP | 1953617 A2 | 8/2008 |
| KR | 20030051239 A | 6/2003 |

OTHER PUBLICATIONS

Search Report for European Patent Application No. 11160597.8; dated Aug. 5, 2011.

(Continued)

*Primary Examiner* — Tuan C. To
*Assistant Examiner* — Yuri Kan
(74) *Attorney, Agent, or Firm* — Baker Hostetler LLP

(57) ABSTRACT

A system and method for automating the selection of vehicle identifying information for a diagnostic tool and for searching multiple databases of fix information and providing such information to a user.

17 Claims, 4 Drawing Sheets

(56) References Cited

U.S. PATENT DOCUMENTS

| | | |
|---|---|---|
| 2007/0156311 A1 | 7/2007 | Elcock et al. |
| 2008/0065289 A1 | 3/2008 | Bertosa et al. |
| 2008/0140281 A1 | 6/2008 | Morris et al. |
| 2008/0249681 A1 | 10/2008 | Bertosa et al. |
| 2008/0270075 A1 | 10/2008 | Bertosa et al. |
| 2009/0271062 A1 | 10/2009 | Grenn |
| 2009/0276115 A1 | 11/2009 | Chen |
| 2009/0300548 A1 | 12/2009 | Sullivan et al. |
| 2009/0305732 A1 | 12/2009 | Marcellino et al. |
| 2010/0106359 A1 | 4/2010 | Underdal et al. |
| 2010/0138701 A1 | 6/2010 | Costantino |
| 2010/0174446 A1 | 7/2010 | Andreasen et al. |
| 2010/0220113 A1 | 9/2010 | Kennedy |
| 2010/0256861 A1 | 10/2010 | Hodges |
| 2010/0293081 A1 | 11/2010 | Liu et al. |
| 2011/0055763 A1 | 3/2011 | Utsuki et al. |
| 2011/0141921 A1 | 6/2011 | Reese et al. |
| 2011/0288954 A1 | 11/2011 | Bertosa et al. |
| 2012/0044086 A1 | 2/2012 | Ruther et al. |
| 2012/0313771 A1 | 12/2012 | Wittliff, III |

OTHER PUBLICATIONS

Search report dated Dec. 3, 2013 for PCT/US2013/057920 filed Sep. 4, 2013.
International Search Report issued Mar. 21, 2014, in connection with PCT Application No. PCT/US13/57930.
Written Opinion issued Mar. 21, 2014, in connection with PCT Application No. PCT/US13/57930.
International Search Report issued Mar. 13, 2014, in connection with PCT/US13/57923.
Written Opinion issued Mar. 13, 2014, in connection with PCT/US13/57923.
Supplementary European search report and the European search opinion dated Feb. 27, 2015.
U.S. Office Action dated Jun. 25, 2015, in U.S. Appl. No. 13/606,755.

* cited by examiner

SYSTEM AND METHOD FOR AUTOMATED VEHICLE SELECTION AND AUTOMATED FIX DETECTION

FIELD OF THE DISCLOSURE

The disclosure generally relates to vehicle diagnostic systems and methods. More particularly to systems and methods for automating aspects of the vehicle diagnostic process.

BACKGROUND OF THE DISCLOSURE

Numerous diagnostic tools exist for servicing modern vehicles equipped with electronic control units (ECUs). The ECUs control the functioning of the various vehicle electronic subsystems such as, for example, transmission control units, electronic ignition systems, air bag systems, keyless entry systems, climate control systems and antilock braking systems. In order to control these electronic subsystems, the ECUs utilize data from various sensors provided throughout the vehicle such as, for example, oxygen sensors, air temperature sensors, throttle position sensors, knock sensors, coolant temperature sensors, and tire pressure monitoring sensors.

The ECUs of modern vehicles are also programmed to alert drivers to various safety and service conditions identified from data collected from the various sensors in the vehicles. Examples of such conditions include, but are not limited to, low tire pressure, recommended oil replacement interval exhausted, low battery charge, faulty oxygen sensor, failed mass airflow sensor and faulty gas cap. While many vehicles have display screens that provide information to a driver on the detection of a safety or service condition, in many vehicles having such ECUs the driver will be alerted to the existence of such a safety or service condition by the illumination of a "check engine" light.

Irrespective of the means of alerting the driver to the presence of a safety or service condition, it is quite often the case that the user cannot determine the precise nature of the condition without resort to the use of a diagnostic tool that links to the ECUs and reads the diagnostic trouble codes stored by the ECUs on the occurrence of a safety or service condition. In addition to storing the safety and service condition data, the ECUs also store information regarding the operational status of the various systems of the vehicle that can be accessed using diagnostic tools. Existing diagnostic tools can also be used to operate the various electronic subsystems of the vehicle during servicing to diagnose problems.

Service procedures have been developed by vehicle manufacturers for performing service on vehicles using diagnostic tools. These procedures provide the ordering of steps to perform to efficiently identify the specific cause of a trouble code. Augmenting the procedures developed by the vehicle manufacturers, assets have been developed for additional repair procedures such as, for example, Repair-Trac®, Code-Assist™, Fast Fixes™, iATN available through the International Automotive Technicians Network (www.iatn.net) and Direct-Hit™ available from Identifix, Inc. (www.identifix.com).

As the information available to technicians through the ECUs has increased, the relative number of procedures has also increased making it more difficult for technicians to identify and effectively utilize these in servicing vehicles. Experience based databases of fix information also exist that augment the procedures developed by the vehicle manufacturers that may not be known to an individual technician or it may not be known by that technician how to coordinate fixes from multiple sources. In addition, as vehicle diagnostic tools become more ubiquitous many such tools are now being sold in the DIY market for backyard mechanics. As the relative level of diagnostic experience of users of such tools decreases the potential for the incorrect usage of such tools has increased and the knowledge of and ability to use relevant diagnostic procedures has diminished. A need therefore exists for methods and systems that will automate set up features for vehicle diagnostic tools as well as automate the identification and usage of relevant diagnostic procedures.

SUMMARY OF THE DISCLOSURE

The foregoing needs are met, to a great extent, by the present disclosure, wherein in one aspect, a system for providing automated fix detection for a vehicle is provided having an input for receiving data associated with a vehicle. The system also includes a microprocessor for processing the data received from the input and for instructing a search of repair assets corresponding to the data regarding the vehicle. The system also includes a notification device for notifying a user of located repair assets and a user interface for selecting repair assets to be provided to the user.

In accordance with other aspects of the present disclosure, a method of providing automated fix detection for a vehicle is provided. The method includes the steps of receiving data associated with a vehicle at a microprocessor of a diagnostic tool and instructing a search of repair assets corresponding to said data associated with said vehicle. The method also includes the steps of triggering an alert regarding the located repair assets and selecting repair assets to be provided to a user.

In accordance with yet other aspects of the present disclosure, a system for providing automated fix detection for a vehicle is provided having means for receiving data associated with a vehicle. The system further includes means for instructing a search of repair assets corresponding to said data associated with said vehicle and means for triggering an alert regarding located repair assets. The system also includes means for selecting located repair assets to be provided to a user.

There has thus been outlined, rather broadly, certain aspects of the invention in order that the detailed description herein may be better understood, and in order that the present contribution to the art may be better appreciated.

In this respect, before explaining at least one embodiment of the invention in detail, it is to be understood that the invention is not limited in its application to the details of the construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE DISCLOSURE

Figure 1:
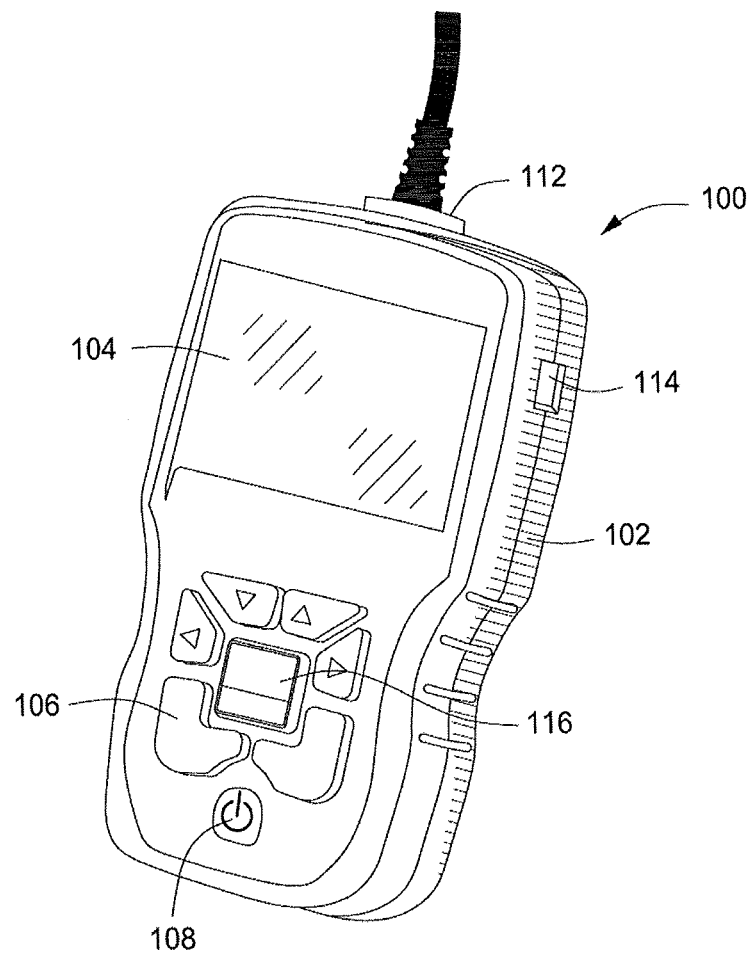
FIG. 1 is a perspective view of a diagnostic tool in accordance with aspects of the present disclosure.

The invention will now be described with reference to the drawing figures, in which like reference numerals refer to like parts throughout. Various aspects of a diagnostic tool of the present disclosure may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components.

An embodiment of the present inventive apparatus is illustrated in FIG. 1. In particular, FIG. 1 is a perspective view illustrating a diagnostic tool 100 in accordance with aspects of the present disclosure. The diagnostic tool 100 can be any computing device, such as the CP9580 diagnostic tool from Service Solutions U.S. LLC in Warren, Mich. The diagnostic tool 100 includes a housing 102 to house the various components of the diagnostic tool, such as a display 104, a user interface 106, a power key 108, a memory card reader (not depicted), a connector interface 112 and a data port 114. Also included in the diagnostic tool is one or more microprocessors for controlling the operation of the tool and carrying out the various functionality described in this specification.

The display 104 can be any type of display, for example, a liquid crystal display (LCD), a video graphics array (VGA), a touch display (which can also be a user interface), etc. The display can turn OFF after a certain period of time that the tool is not being used. For example, when no buttons are pressed or no data has been retrieved from the vehicle for a predetermined time, for example, ten minutes, five minutes, three minutes or 1 minute, the display can automatically be shut off to conserve battery power. However, any time period can be set for turning OFF the display so that the battery (internal) can be conserved.

The user interface 106 allows the user to interact with the diagnostic tool 100 in order to operate the diagnostic tool as desired. The user interface 106 can include function keys, arrow keys or any other type of keys that can manipulate the diagnostic tool 100 in order to operate various menus that are presented on the display. In one embodiment, the diagnostic tool 100 can include a keypad test to determine if the keys are working properly. In this embodiment, the key for scroll direction is pressed to invert colors on the display. If the colors do not invert, then the key is not working properly. Other embodiments can include tests that include sound, vibration and the like to indicate if the keys are working properly.

The keys can also include a "back" or "enter" or a "code connect" key 116. Once activated, the code connect key 116 can display additional information about a diagnostic test code (DTC) or other diagnostic information as discussed herein. The input device 106 can also be a mouse or any other suitable input device, including a keypad, or a scanner. The user interface 106 can also include numbers or be alphanumeric.

The power key 108 allows the user to turn the diagnostic tool 100 ON and OFF, as required. The diagnostic tool 100 can automatically turn OFF after a user-selectable period of time of inactivity (e.g. no buttons pressed or data being collected from the vehicle). The power for the diagnostic tool 100 can be supplied from internal batteries of the tool or from the vehicle's battery when the tool is coupled to the data link connector (DLC) or from a connection to a computing device, such as through a USB connection. If the power source is the vehicle or through a connection (such as a computing device), then the tool can power on automatically once the tool is connected to the vehicle or computing device.

Memory card reader (optional) can be a single type card reader, such as a compact flash card, floppy disc, memory stick, secure digital memory, flash memory or other types of memory. The memory card reader can be a reader that reads more than one of the aforementioned memory such as a combination memory card reader. Additionally, the memory card reader can also read any other computer readable medium, such as CD, DVD, UMD, etc. In one embodiment, the memory card reader can be used to update the software or databases that are in the diagnostic tool 100.

The connector interface 112 allows the diagnostic tool 100 to connect to an external device, such as an ECU of a vehicle, a computing device, an external communication device (such as a modem), a network, etc. through a wired or wireless connection (not shown). In addition, a data port 114 can also be included on the diagnostic tool 100 in order to connect to USB, FIREWIRE, modem, RS232, RS485, and other connections to communicate with external devices, such as a hard drive, USB drive, CD player, DVD player, UMD player, PC or other computer readable medium devices.

Figure 2:
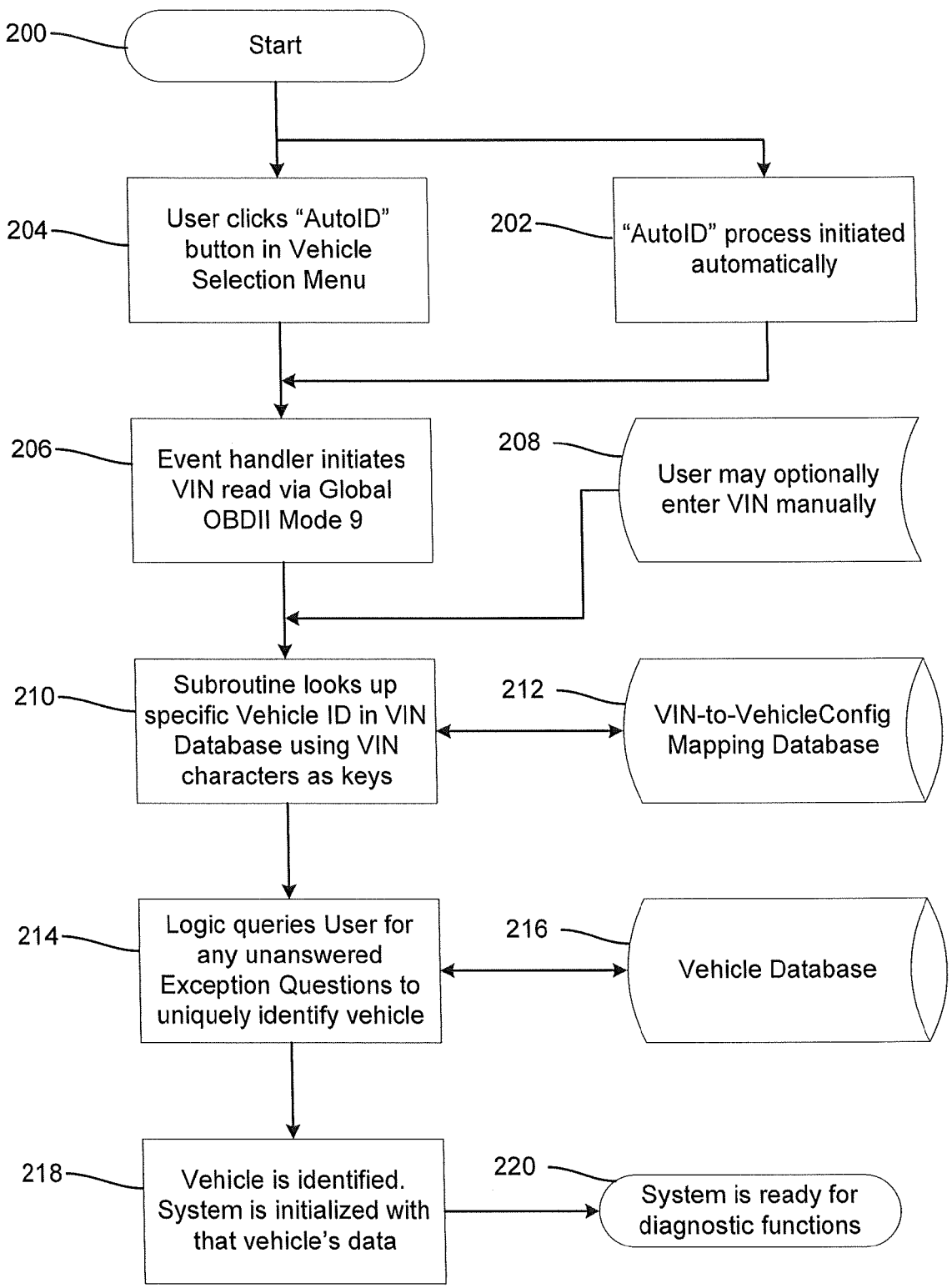
FIG. 2 is a flow diagram of an automated vehicle selection process in accordance with aspects of the present disclosure.

In FIG. 2 there is shown a flow chart of a process for automating the selection of the vehicle and ECUs being serviced by a technician. It is noted that the selection of the vehicle includes selection of such information as the make, model and year of the vehicle as well as vehicle specific equipment such as engine type, transmission type, airbags, anti-lock brakes, etc. After the diagnostic tool is started 200, and if so configured, the device will automatically start the vehicle identification process (AutoID process) 202. Alternatively, the AutoID process may be started upon the occurrence of some predetermined event such as, for example, connecting the diagnostic device to the OBDII connector. If the device is not configured to launch the AutoID process automatically on the occurrence of some event, such as turning on the device or connecting the device to the OBDII, the user may manually initiate the AutoID process 204 by scrolling to the AutoID process option in a vehicle selection menu using the user interface buttons 106.

Whether automatically initiated 202 or selected by the user 204, the first step of the AutoID process 206 is for the event handler of the diagnostic tool 100 to initiate a read of the vehicle identification number (VIN) as stored on the ECU. This read of the VIN number can be accomplished, for example, using the global OBDII mode 9 functionality. Alternatively, for vehicles that do not include the global OBDII mode 9 functionality, the user may enter the VIN number manually 208.

Following the entry of the VIN number, either automatically 206 or manually 208, the subroutine 210 of the AutoID process looks up the vehicle in a VIN to vehicle configuration mapping database 212. In addition to the VIN number, information that can be obtained by this subroutine 210 using the global OBDII mode 9 functionality includes calibration identification information as well as vehicle in-use performance information. Examples of such information includes engine type, transmission type, engine tuning specification, etc. It should be readily understood by those skilled in the art that databases, such as the VIN to vehicle configuration mapping database 212, can be accessed by the diagnostic tool 100 over the internet through a wired connection to the data port 114 or connector interface 112 or, alternatively through a wireless modem (not shown).

It may not be possible to determine the full set of required vehicle selection information from the information acquired by the subroutine 210 of the AutoID process and thus, it may be necessary for the user to manually input additional information 214. Alternatively, additional automated searching of the system for vehicle identification information may also be performed as part of the AutoID process. The manual entry of additional information 214 or alternative additional automated searching may be facilitated by referral of the system to internal or external vehicle database 216.

Once the vehicle is identified the diagnostic tool is initialized with appropriate data for that vehicle 218. The diagnostic tool is then ready to perform diagnostic testing of the vehicle to which it is linked 220. It should be readily recognized that the various steps of the process of FIG. 2 may be repeated as appropriate in order to automate as much of the vehicle selection process as practicable. Thus, if it becomes necessary for a user to enter some portion of the vehicle selection data manually, the AutoID process may refer to the vehicle database 216 after the manual entry of one or more individual pieces of vehicle identification data by the user to determine if any or all remaining data can be automatically populated.

In the event that an incorrect controller is installed in a vehicle, the vehicle may not be properly identified. To the extent such a condition is identified by the AutoID process, the user will be notified by means of an appropriate warning message on the display screen 104 of the diagnostic tool 100. Where this occurs, or where the user determines that the vehicle automatically identified by the AutoID process is incorrect, the user may override the AutoID process and manually enter the vehicle identification information or exit the process.

The diagnostic tool 100 can be configured additionally or alternatively to look up on-tool and/or off-tool repair assets to provide service and repair information to a user automatically once one or more diagnostic trouble codes (DTCs) are read by the diagnostic tool 100 and/or fault symptoms are entered into the diagnostic tool 100. For purposes of this specification this functionality will be referred to generally as automated fix detection. Examples of on-tool repair assets would include repair procedures provided by the original equipment manufacturers and experience based repair information downloaded and stored to the diagnostic tool 100. Examples of off-tool repair assets include such assets as IATN and Direct-Hit™. The system resources for performing automated fix detection in accordance with aspects of the present disclosure will now be described in connection with FIG. 3.

Figure 3:
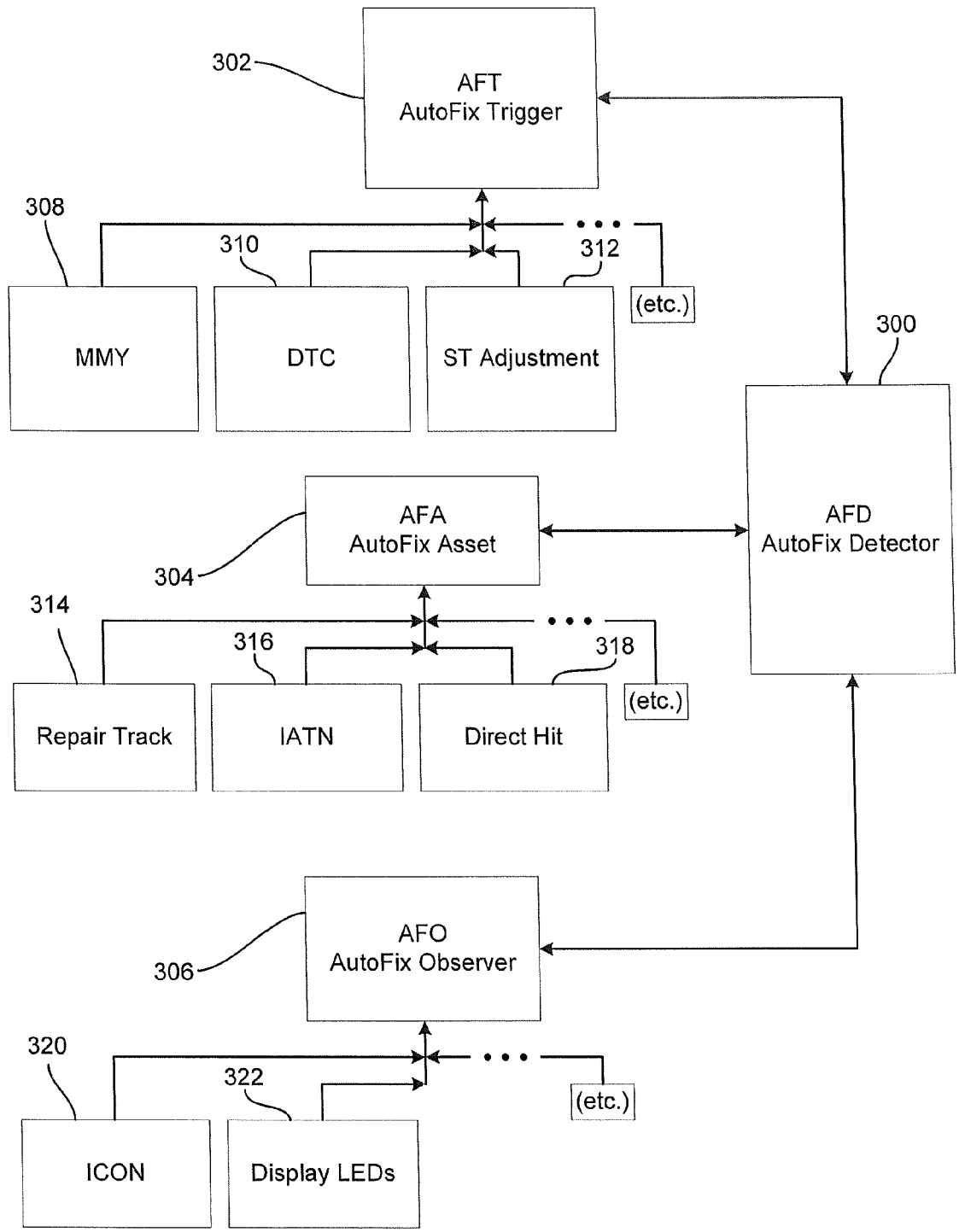
FIG. 3 is a system resource diagram for an automated fix detection process of the diagnostic tool of FIG. 1, in accordance with aspects of the present disclosure.

The system resources of FIG. 3 automate the connection of various diagnostic information sources by continually monitoring both the technician diagnostic selections and results and any underlying automatic software acquired knowledge such as protocol or variant detection. These system resources use the knowledge gained from these activities to automatically trigger background processes that search available repair assets that could assist in fixing the vehicle. Once the repair assets are identified, the user is automatically notified of found assets. Such notification can be provided in non-obtrusive but obvious notification of the presence of such assets as well as information about the found assets such as the location from which the asset derived, what information triggered the location of the asset and what steps to take to implement the fix identified in the asset.

The system resources of FIG. 3 are embodied in four primary modules consisting of an AutoFix Detector Module 300, and Auto-Fix Trigger module 302, an AutoFix Asset Module 304 and AutoFix Observe module 306. Although the present embodiment is described in the context of four logical modules, it should be readily recognized that the functionality can be distributed in more or less logical modules. Moreover, although some of the resources are described as located on-tool and some are located off-tool, it should be readily recognized that the location of such assets is not necessary to the operation of the invention and thus, the resources can be moved on or off-tool as appropriate to a particular implementation of the invention. The functionality of each of the foregoing modules will now be described The AutoFix Detector module 300 is the main component that runs the automated fix detection process. This process continually runs in the background and is non-obtrusive to the user in both presentation and diagnostic functionality. That is, the user is notified of fix assets, but is not impacted as diagnostic selections are performed. The notification can be automatic and dynamic.

The Auto-Fix Trigger module 302 receives the data from the user or automated collection that can trigger a search or a refinement of a search of the AutoFix Assets module 304. The trigger list is dynamically extensible and thus, new triggers can be added to the AutoFix Detector module 304 as they are created so that all available repair assets can be utilized. Examples of AutoFix Triggers include the following data Make/Model/Year 308, DTCs 310 and Special Tests 312. Other examples of such data triggers include Automatic Protocol/Variant Detection, Freeze Frame, AST and Quick DTC.

The AutoFix Asset module 304 searches fix information from search assets. The asset list is dynamically extensible and thus, new assets can be added as they are created. The assets that can be searched can be on-tool or off-tool and, if off-tool, can be accessed over the internet or by other means of linking the diagnostic tool to a database of repair assets such as through the data port 114 or connector interface 112. One or more, or all, assets are searched once triggered so that when a new asset is added it is available for all currently running triggers. Examples of AutoFix Assets include the Repair-Trac® database 314, the iATN database 316 and the Direct-Hit™ database 318. Other examples of AutoFix Assets are the OBD code libraries.

The AutoFix Observer module 306 is the component that notifies the user of the presence of repair assets. In one embodiment, users can select more than one AutoFix Observer notification mechanism and configure how each one operates. For example, an AutoFix Observer notifier can be configured to display an icon 320 in the bottom right hand corner of the screen 104. This notifier can be updated dynamically with the current repair assets available via a superscript count of the assets. The icon 320 could be selected and then within that selection the contents of the assets are available. In addition, or alternatively, a notifier can be provided by the AutoFix Observer module 308 to alert the user by means of flashing the main power LED 322 of the tool signifying the availability of a repair asset. By using multiple notifiers the user can program the diagnostic tool to inform him in the most effective way for him. Examples would be causing the main power LED 322 to blink when the user is away from the tool after starting the diagnostic process, as determined by the absence of input received through the tool interface 106. The technician is thereby notified of the presence of a repair asset and can go immediately to the icon 320 to examine the asset.

Figure 4:
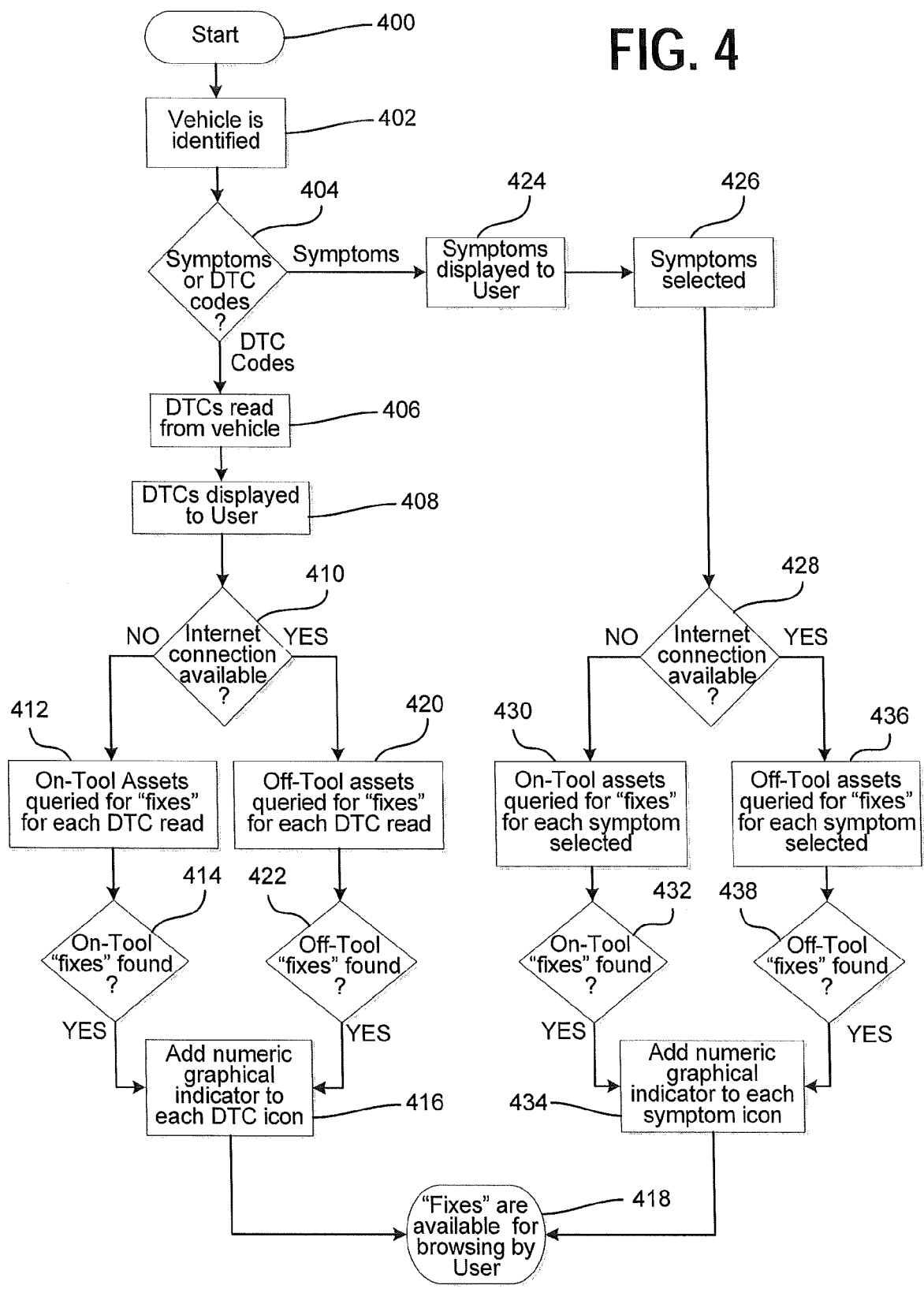
FIG. 4 is a flow diagram for an automated fix detection process in accordance with aspects of the present disclosure.

In another embodiment of the invention, the AutoFix Detector is configured to provide a user with a repair procedure after reading particular DTCs or receiving inputted symptoms from the user. The repair procedure can be one provided by the original equipment manufacturer (OEM) of the vehicle or an experience based procedure identified as an improvement on the OEM procedure. In addition to the repair procedure, the user will be alerted unobtrusively to the presence of additional repair assets that can be accessed by the user. As the steps of the repair procedure are carried out, additional triggers are provided to the Auto-Fix Trigger module 302 causing the AutoFix Asset module 304 to perform additional searches of the available repair assets. In this way, the available repair assets will be continuously updated as repairs are being performed.

Where multiple fix assets are located, the system can notify the user of preferred ordering to assist in improving the efficiency of a repair. Various methodologies can be utilized in determining such ordering which will be readily apparent to those skilled in the art and include setting a default ordering, e.g., tool manufacturers procedures first, OEM manufacturer procedures second, iATN database procedures third, etc., or can be determined dynamically using such data as feedback data regarding the usefulness of the repair information as collected by the database provider. Alternatively, the user may be provided with a default procedure, e.g., the tool manufacturers procedure, and other fix assets only made available to the user on request following a prompt regarding availability of such assets. It is noted that the foregoing are only exemplary and other paradigms for providing this data to a user are considered to be within the scope of the present invention. A process for performing automated fix detection in accordance with aspects of the present invention is depicted in FIG. 4. Following the start of this process 400, the vehicle to be services will be identified at step 402. The identification of the vehicle to be serviced can be accomplished by manual entry of the vehicle information or by utilization of the process described above in connection with FIG. 2.

Following the identification of the vehicle at step 402, the user will be presented with an option of having the diagnostic tool 100 read the trouble codes (DTCs) from the vehicle or having the symptoms being experienced manually entered into the diagnostic device at step 404. If the user selects to have the DTCs read by the vehicle at step 406, information including or relating to the DTC will be displayed to the user at step 408 on the display screen 104. Following the display of the DTCs or associated information the diagnostic tool will determine whether a link to external databases of fix data is available at step 410, such as an internet connection, in order to determine whether external repair assets will be made available to the user.

If no link to external databases of fix data is available, only on-tool assets will be available to the user to guide the user in repairing the vehicle. A query will be made at step 412 for such repair procedures and other experienced based repair information stored on the diagnostic tool. If on-tool fix information is located at step 414 that is relevant to the DTCs, this will be displayed to the user correlated to the corresponding DTC. These fixes will then be made available to the user for browsing at step 418 by means of the display screen 104 and interface 106.

Because there may be more than one fix recommendation for each DTC, the fixes can be provided to the user with a graphical numerical indicator at step 416 designating a recommended order for attempting the fixes. The protocol for generating the recommended ordering for attempting fixes can be created based upon input from experienced service technicians and thus, provides an inexperienced or less experienced user with the advantage of experience based diagnostic procedures.

Where the DTCs are read automatically and an internet connection is available, off-tool fix assets can be queried at step 420 by the diagnostic tool. Where off-tool assets are found at step 422 these will be provided to the user in the same manner as on-tool assets at step 414. It should be readily recognized by those skilled in the art that the querying of off-tool fix assets does not preclude the querying of on-tool fix assets or vice versa. Thus, the diagnostic tool may be programmed to exclusively use internet-based fix assets where internet access is available or use both on-tool and off-tool fix assets.

If the diagnostic tool 100 does not read the DTCs of the vehicle, the user can utilize the automated fix capabilities of the tool by entering symptoms. In accordance with aspects of this disclosure, symptoms can be displayed to the user at step 424 with the symptoms then being selected by the user at step 426. Any mechanism for displaying the symptoms can be utilized in connection with the present invention such as a hierarchical approach in which a main system, such as engine, transmission, brakes, etc., experiencing the symptom is first selected by the user. Then one or more levels of subsystems of that main system may be displayed to the user for selection followed by the display of common symptoms of such subsystems.

Once the symptoms are entered, the process proceeds through the same steps performed when DTC codes are read. Thus, the diagnostic tool will determine whether internet access is available at step 428 and then query on-tool assets at step 430 and/or off tool assets at step 436, determine whether any fixes are recommended by such on-tool and/or off-tool assets at steps 432, 438, respectively, and then correlated these fixes to the symptom identified by the user. The fixes are then displayed to the user for browsing at step 418 using the interface 106 and display screen 104 of the diagnostic tool 100. At step 416, the numeric graphical indicator is added to each symptom icon.

It is to be understood that any feature described in relation to any one aspect may be used alone, or in combination with other features described, and may also be used in combination with one or more features of any other of the disclosed aspects, or any combination of any other of the disclosed aspects. For example, the reading of DTCs by the diagnostic tool does not have to be exclusive of the entry of symptoms by the user. Instead, the diagnostic tool can read the DTCs and query for on-tool and off-tool fix assets based upon those DTCs while also querying for on-tool and off-tool fix assets based upon symptoms entered by the user. It should be recognized that the utilization of both DTCs and symptoms can be useful in refining identified fix assets to those that are appropriate to recommend to the user as well as refining the recommended order of performing such fixes.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A system for providing automated fix detection for a vehicle, the system comprising:

an input configured to receive data associated with said vehicle; and one or more microprocessors configured to execute:

an automatic identification process that reads a vehicle identification number from said vehicle using global OBDII mode 9 functionality and if an incorrect controller is installed on said vehicle, the automatic identification process will notify a user of an improper identification and allows the user to override the automatic identification process and manually enter vehicle identification information;

an auto-fix trigger module comprising computer executable instructions stored on a memory of the system that process said data received from the input and instructs a search of repair assets;

an auto-fix asset module comprising computer executable instructions stored on the memory that search an on-tool database, and if a tool is connected to a network, also on an off-tool database, to retrieve repair assets corresponding to said data associated with said vehicle, said repair assets comprising at least one repair action;

an auto-fix observer module comprising computer executable instructions stored on the memory that notify the user of the retrieved repair assets via a blinking light when the user is absent from the tool, the absence of the user determined by an absence of input to the tool; and an auto-fix detector module comprising computer executable instructions stored on the memory that display a user interface including selectable repair assets that are provided to the user, wherein the auto-fix asset module further comprising computer executable instructions stored on the memory to conduct a further search on the on-tool database, and if the tool is connected to the network, also on the off-tool database, automatically and without human interaction, to retrieve other repair assets in response to new data received from the input following performance of the at least one repair action on the vehicle.

2. The system of claim 1, wherein the data associated with the vehicle includes vehicle identification data that is read by the system from the vehicle via a link to an on board diagnostic connector on the vehicle.

3. The system of claim 1, wherein the tool is connected to the network, and the data associated with the vehicle includes vehicle identification data that is obtained by the system from the off-tool database based upon data input to the system by the user.

4. The system of claim 1, wherein the data includes diagnostic trouble codes read by the system via a link to an on-board diagnostic connector on the vehicle.

5. The system of claim 1, wherein the tool is connected to the network, and the auto-fix asset module conducts an additional search in the off-tool database for repair assets in response to data input through the user interface.

6. A method of providing automated fix detection for a vehicle, comprising the steps of:

receiving data associated with said vehicle at an input of a diagnostic tool;

identifying, using an automatic identification process, said vehicle by reading a vehicle identification number from said vehicle using global OBDII mode 9 functionality and if an incorrect controller is installed on said vehicle, notifying a user of an improper identification and allowing the user to override the automatic identification process and manually enter vehicle identification information;

receiving, from an auto-fix trigger module comprising computer executable instructions stored on a memory of the system that process said data received from the input, instruction for a search of repair assets;

searching, using an auto-fix asset module comprising computer executable instructions stored on the memory, an on-tool database, and if the diagnostic tool is connected to a network, also on an off-tool database, to retrieve repair assets corresponding to said data associated with said vehicle, said repair assets comprising at least one repair action;

triggering, using an auto-fix observer module comprising computer executable instructions stored on the memory, an alert regarding existence of the retrieved repair assets via a blinking light when the user is absent from the tool, the absence of the user determined by an absence of input to the tool;

receiving, using an auto-fix detector module comprising computer executable instructions stored on the memory, a selected repair action from among the retrieved repair assets provided to the user on a user interface; and performing, using the auto-fix asset module comprising computer executable instructions stored on the memory, a further search on the on-tool database, and if the tool is connected to the network, also on the off-tool database, automatically and without human interaction, to retrieve other repair assets in response to new data received from the input following performance of the selected repair action on the vehicle.

7. The method of claim 6, further comprising the step of linking the input to the vehicle via an on board diagnostic connector on the vehicle to receive data associated with said vehicle.

8. The method of claim 6, wherein the diagnostic tool is connected to the network, and further comprising the step of obtaining vehicle identification data from the off-tool database.

9. The method of claim 6, further comprising the step of receiving a diagnostic trouble code via a link to an on-board diagnostic connector on the vehicle.

10. The method of claim 6, wherein the diagnostic tool is connected to the network, and further comprising the step of performing, using auto-fix asset module, an additional search of the off-tool database for repair assets in response to data input through the user interface.

11. The method of claim 6, wherein the diagnostic tool is connected to the network, and further comprising the step of displaying, using an auto-fix detector module, the other repair assets retrieved by the search of the off-tool database in response to the new data.

12. A system for providing automated fix detection for a vehicle, the system comprising:

means for receiving data associated with said vehicle at an input of a diagnostic tool;

means for identifying, using an automatic identification process said vehicle by reading a vehicle identification number from said vehicle using global OBDII mode 9 functionality and if an incorrect controller is installed on said vehicle, notifying a user of the improper identification and allowing the user to override the automatic identification process and manually enter vehicle identification information;

means for processing said data received from the input and instructing a search of repair assets;

means for searching on an on-tool database, and if the diagnostic tool is connected to a network, also on an off-tool database, to retrieve repair assets corresponding to said data associated with said vehicle, said repair assets comprising at least one repair action;

means for notifying a user of the retrieved repair assets via a blinking light when the user is absent from the tool, the absence of the user determined by an absence of input to the tool; and means for selecting repair assets that are provided to the user on a user interface, wherein the means for searching further searching on the on-tool database, and if the diagnostic tool is connected to the network, also on the off-tool database, automatically and without human interaction, to retrieve other repair assets in response to new data received from the input following performance of the at least one repair action on the vehicle.

13. The system of claim 12, further comprising means for linking the microprocessor to the vehicle via an on board diagnostic connector on the vehicle to receive vehicle identification data.

14. The system of claim 12, wherein the diagnostic tool is connected to the network, and further comprising means for obtaining vehicle identification data from the off-tool database.

15. The system of claim 12, further comprising means for receiving a diagnostic trouble code via a link to an on-board diagnostic connector on the vehicle.

16. The system of claim 12, wherein the diagnostic tool is connected to the network, and further comprising means for performing an additional search of the off-tool database for repair assets in response to data input through the user interface.

17. The system of claim 12, further comprising means for displaying the retrieved repair assets.

* * * * *